(12) United States Patent
Lin et al.

(10) Patent No.: US 12,059,645 B1
(45) Date of Patent: Aug. 13, 2024

(54) CONDENSATION REMOVAL FROM COMPRESSED GAS SYSTEMS

(71) Applicant: 10X Genomics, Inc., Pleasanton, CA (US)

(72) Inventors: Bill Kengli Lin, Pleasanton, CA (US); Eric Anderson, Lafayette, CA (US); Pratomo Alimsijah, Pleasanton, CA (US); Alexander Post Kindwall, Pleasanton, CA (US); Kevin Gilmartin, Belmont, CA (US); Michael John Tierney, Pleasanton, CA (US)

(73) Assignee: 10x Genomics, Inc., Pleasanton, CA (US)

(*) Notice: Subject to any disclaimer, the term of this patent is extended or adjusted under 35 U.S.C. 154(b) by 386 days.

(21) Appl. No.: 17/314,627

(22) Filed: May 7, 2021

Related U.S. Application Data

(60) Provisional application No. 63/021,980, filed on May 8, 2020.

(51) Int. Cl.
*B01D 5/00* (2006.01)
*B01D 53/26* (2006.01)

(52) U.S. Cl.
CPC ........... *B01D 5/009* (2013.01); *B01D 5/0009* (2013.01); *B01D 5/0045* (2013.01); *B01D 53/265* (2013.01); *B01J 2219/0099* (2013.01)

(58) Field of Classification Search
None
See application file for complete search history.

(56) References Cited

U.S. PATENT DOCUMENTS

| | | | | |
|---|---|---|---|---|
| 3,174,171 A | * | 3/1965 | McDermon | F16L 55/46 15/104.062 |
| 3,783,969 A | * | 1/1974 | Pall | B07B 1/4663 415/119 |
| 8,389,960 B2 | | 3/2013 | Pieprzyk et al. | |
| 9,410,975 B2 | | 8/2016 | Li et al. | |
| 9,694,361 B2 | | 7/2017 | Bharadwaj et al. | |
| 10,688,494 B2 | | 6/2020 | Bharadwaj et al. | |
| 2005/0023075 A1 | * | 2/2005 | Schmaeman | F16L 55/033 181/233 |
| 2006/0159593 A1 | * | 7/2006 | Torisawa | B01L 3/50255 422/400 |
| 2013/0196276 A1 | | 8/2013 | Lee et al. | |
| 2016/0131591 A1 | * | 5/2016 | Campbell | G01N 33/1826 435/5 |
| 2017/0145933 A1 | * | 5/2017 | Dudar | B60W 20/00 |
| 2019/0072987 A1 | | 3/2019 | Ludwig et al. | |
| 2019/0151768 A1 | | 5/2019 | Uthemann et al. | |
| 2019/0154551 A1 | | 5/2019 | Richter et al. | |

OTHER PUBLICATIONS

"Flow Resistance" Elveflow, <https://www.elveflow.com/microfluidic-reviews/general-microfluidics/flow-resistance/> retrieved on Feb. 7, 2024 (6 pages).

* cited by examiner

*Primary Examiner* — Gabriel E Gitman
(74) *Attorney, Agent, or Firm* — Clark & Elbing LLP (57) ABSTRACT

Devices and methods are provided for reducing or removing condensation from compressed air.

9 Claims, 6 Drawing Sheets

CONDENSATION REMOVAL FROM COMPRESSED GAS SYSTEMS

BACKGROUND OF THE INVENTION

Bio-instrumentation frequently makes use of pressure from compressed air to actuate components. Compressed air carries water vapor that can condense inside an instrument. Condensed water can present problems for water-sensitive components, e.g., electrical components or sensors. Thus, there is a need for removal of condensed water from instruments.

SUMMARY OF THE INVENTION

We have developed devices and methods for supplying compressed gas to an instrument that reduce or prevent the build-up of condensed liquid in the instrument. Devices and methods may be maintenance free, i.e., not requiring user intervention. The devices and methods may also be compatible with low operating pressures, e.g., less than 43 psi.

In one aspect, the invention provides a device for removing liquid from a gas flow including a flow path including a condenser, a medium having a surface area per unit volume of at least 1.62 $mm^{-1}$ and a source of heat or vacuum for removing the liquid from the medium, where the medium is disposed to adsorb liquid condensed by the condenser.

In some embodiments, the condenser includes a condensing surface, cooled by a heat exchanger to below the dewpoint of the liquid; a micron scale filter; a vortex from directed gas flow; a refrigerated compressed air dryer; or a porous substrate. In some embodiments, condensed liquid is passively transported to the medium by gravity or capillary action. In some embodiments, the medium includes a sintered metal filter, a pellet mesh, or metal fins. In some embodiments, the surface area of the medium is sufficient to condense 100-1000 μL of the liquid. In some embodiments, the vacuum source exerts a negative pressure of between 14.6 and 0 psi absolute. In some embodiments, the heat source heats the medium to a temperature of 65° C. to 98° C.

In certain embodiments, the device further includes a gas inlet, a condenser channel, a liquid trap, and a gas outlet; where the gas inlet is in fluid communication with the condenser channel, where the condenser channel is in fluid communication with both the liquid trap and gas outlet, where the condenser is disposed within the condenser channel, where the medium is disposed within the liquid trap, and where the medium and heat source are in thermal communication or the medium is in fluid communication with a source of vacuum. In particular embodiments, the device includes both a heat and a vacuum source. In some embodiments, the condenser includes a bundle of tubes or fins in thermal communication with a heat exchanger.

In some embodiments, the device includes a microporous filter disposed downstream of the condenser. In certain embodiments, the microporous filter has an average pore diameter of 1-10 μm.

Another aspect of the invention provides a method of removing liquid from a gas supplied to a device of the invention by flowing gas through the device and allowing liquid in the gas to be condensed by the condenser, where it is adsorbed by the medium. In certain embodiments, liquid is removed from the medium using heat or vacuum. In some embodiments, the gas flow leaving the condenser is substantially free of the liquid. In certain embodiments, the heat source provides heat such that the medium is heated to a temperature of 65° C. to 98° C. In some embodiments, the gas includes air, and the liquid includes water. In some embodiments, the gas flow has a flow rate between 27 sccm and 931 sccm. In certain embodiments of the method, the gas flow is at a pressure of between 24 psi and 34 psi. In some embodiments, the gas flow leaving the condenser is cooled to about 1° C.

In another aspect, the invention provides a device including (a) a first flow path having proximal and distal ends; (b) a second flow path having proximal and distal ends; (c) a valve at the distal end of the first flow path; (d) a gas compressor; and (e) a pneumatic actuator or manifold; where the gas compressor is in fluid communication with the proximal end of the first flow path; where the valve is disposed to control flow from the distal end of the first flow path to the pneumatic actuator or manifold to the proximal end of the second flow path; and where the second flow path has a lower fluidic resistance than the first flow path.

In some embodiments, the device further includes a bleed outlet in the manifold in fluid communication with the first flow path. In certain embodiments, the bleed outlet includes a muffler with pore size ranging from 5 μm to 100 μm. In some embodiments, the valve includes a 3/2 valve or a solenoid valve. In some embodiments, the pneumatic actuator controls fluid flow in or the manifold distributes gas flow to a microfluidic device. In some embodiments, the ratio of the fluidic resistances of the first and second flows is from 37 to 65000. In some embodiments the device further includes a PID control for pressure.

In an aspect, the invention provides a method of operating a device of the invention by directing gas from the compressor through the valve to the pneumatic actuator or manifold for a first predetermined amount of time, where a condensate forms in the first flow path; and directing gas from the compressor through the valve to the second flow path for a second predetermined amount of time to reduce the condensate in the first flow path.

In some embodiments, the second predetermined time is between 15 s and 300 s. In certain embodiments, the compressor compresses ambient air. In some embodiments, the ambient air includes water vapor between 15 and 100% saturation. In particular embodiments, the first predetermined time is between 10 minutes and 1 h. In some embodiments, the flow rate to the actuator or manifold is between 27 sccm and 931 sccm. In certain embodiments the gas flow to the actuator or manifold is at a pressure of between 24 psi and 34 psi in the first flow path. In some embodiments, the flow rate in the second flow path is between 0.035 scfm and 63 scfm. In some embodiments, the gas flow in the first flow path is at a pressure of between 0 and 32 psi when the condensate is being reduced.

It will be understood that the devices, systems, and methods described herein may, in addition to features specified, include any feature described herein that is not inconsistent with the structure of the underlying device, system, or method.

Definitions

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

The term "about," as used herein, refers to ±10% of a recited value.

The term "condenser," as used herein, refers to an element that induces the formation of a liquid from a gas.

The term "fluidically connected," as used herein, refers to a direct connection between at least two device elements, e.g., a condenser channel, liquid trap, etc., that allows for fluid to move between such device elements without passing through an intervening element.

The term "in fluid communication with," as used herein, refers to a connection between at least two device elements, e.g., a condenser channel, liquid trap, etc., that allows for fluid to move between such device elements with or without passing through one or more intervening device elements.

DETAILED DESCRIPTION OF THE INVENTION

The invention provides devices and methods to reduce condensate in systems, e.g., for microfluidic devices, actuated by compressed air. The device may be automated and maintenance free and can operate at low pressures (e.g., below 43 psi). Devices of the invention are also advantageous in not requiring temperature control of the flow paths to be above the dew point of water in the compressed gas.

Devices Devices of the invention include mechanisms to reduce the accumulation of condensation during operation. Devices may reduce condensation by condensing liquid in a condenser from which the liquid may be removed or by directing condensation, e.g., on the walls of a flow path, outside of the device. The invention may be employed with any device employing condensed gas. It is particularly advantageous for devices including components that are sensitive to moisture, e.g., devices for sample preparation or analysis using microfluidics.

One device of the invention for removing liquid from a gas flow includes a flow path including a condenser, a medium having a surface area per unit volume of at least 1.62 mm$^{-1}$, and a source of heat or vacuum for removing the liquid from the medium. The medium (e.g., a sintered metal filter, pelleted mesh, or metal fins) is disposed to adsorb liquid condensed by the condenser. Inclusion of a medium in the flow path allows condensed water to be removed more efficiently, e.g., by heat, vacuum, or air flow, which in turn reduces or eliminates the need for a collection reservoir that has to be emptied by the user. Water removal can be programmed into the workflow of the device, and thus devices of the invention are amenable to continuous automated workflows.

In certain embodiments, the device further includes a gas inlet, a condenser channel, a liquid trap, and a gas outlet. The gas inlet is in fluid communication with the condenser channel. The condenser channel is in fluid communication with both the liquid trap and gas outlet. The condenser is disposed within the condenser channel. In some embodiments the medium is disposed within the liquid trap. The medium can be heated by a heat source (e.g., resistive heater or Peltier), and/or the medium is in fluid communication with a source of vacuum (e.g., vacuum pump or aspirator). The device may further include the heat source and/or vacuum source.

When the device includes a condenser and a liquid trap that includes the medium, these elements can be disposed such that liquid is passively transported from the condenser to the trap and the medium, e.g., by gravity or by capillary action.

In some embodiments, the device further includes a microporous filter disposed downstream of the condenser. Placing a microporous filter downstream of the condenser can improve the liquid reducing capacity of the system by catching droplets that would otherwise exit the condenser. In certain embodiments, the microporous filter has an average pore diameter of about 1-10 µm, e.g., about 1-2 µm (e.g., about 1 µm, 1.1 µm, 1.2 µm, 1.3 µm, 1.4 µm, 1.5 µm, 1.6 µm, 1.7 µm, 1.8 µm, 1.9 µm, or 2 µm), or e.g., about 2-10 µm (e.g., about 2.0 µm, 2.5 µm, 3 µm, 3.5 µm, 4 µm, 4.5 µm, 5.0 µm, 5.5 µm, 6 µm, 6.5 µm, 7 µm, 7.5 µm, 8 µm, 8.5 µm, 9 µm, 9.5 µm, or 10.0 µm).

A flow path may be of any suitable length and diameter. Exemplary diameters are between about 0.1 and 100 mm, e.g., between about 1 and 10 mm, e.g., about 3 mm.

In an alternative embodiment, the device of the invention does not employ a medium to capture condensate. Instead, the device includes a flow path in which water can condense during a predetermined amount of time of gas flow. After that time, a valve connects the flow path to an outlet to allow the condensate to be removed from the device via the outlet. In one example, the device includes a first flow path having proximal and distal ends; a second flow path having proximal and distal ends; a valve at the distal end of the first flow path; a gas compressor; and a pneumatic actuator or manifold. The pneumatic actuator or manifold controls or distributes gas flow, e.g., for analysis or sample preparation in a microfluidic device. The gas compressor is in fluid communication with the proximal end of the first flow path. The valve is disposed to control flow from the distal end of the first flow path to the pneumatic actuator (or manifold) or to the proximal end of the second flow path. The second flow path may have a lower fluidic resistance than the first flow path. By redirecting the gas flow to the second flow path, moisture in the first flow path can be removed from the device, e.g., pushed out by higher velocity flow, thus preventing condensate build-up in the system.

In some embodiments, the device further includes a bleed outlet in the pneumatic actuator or manifold in fluid communication with the first flow path. For example, the device further includes a PID (proportional-integral-derivative) controller for pressure, which requires the bleed valve. In certain embodiments, the bleed outlet includes a muffler with pore size ranging from about 5 µm to 100 µm, e.g., about 5-10 µm (e.g., about 5.0 µm, 5.5 µm, 6 µm, 6.5 µm, 7 µm, 7.5 µm, 8 µm, 8.5 µm, 9 µm, 9.5 µm, or 10.0 µm), about 10-50 µm, (e.g., about 10 µm, 15 µm, 20 µm, 25 µm, 30 µm, 35 µm, 40 µm, 45 µm, or 50 µm), or about 50-100 µm (e.g., about 50 µm, 60 µm, 70 µm, 80 µm, 90 µm, or 100 µm). By restricting the air flow through the bleed outlet, e.g., with smaller pore sizes in the muffler or using a small diameter orifice, less gas passes through the device and any condensation can be limited to the first flow path.

In some embodiments, the valve can be a 3/2 valve or a solenoid valve. In some embodiments, the pneumatic actuator or manifold controls fluid flow in a microfluidic device.

In some embodiments, the ratio of the fluidic resistances of the first and second flow path is from about 37 to 65000, e.g., about 37-50 (e.g., about 37, 38, 39, 40, 41, 42, 43, 44, 45, 46, 47, 48, 49, or 50), about 50-100 (e.g., about 50, 55, 60, 65, 70, 75, 80, 85, 90, 85, or 100), about 100-1000 (e.g., about 100, 200, 300, 400, 500, 600, 700, 800, 900, or 1000), about 1000-10000 (e.g., about 1000, 2000, 3000, 4000, 5000, 6000, 7000, 8000, 9000, or 10000), about 10000-25000 (e.g., about 10000, 11000, 12000, 13000, 14000, 15000, 1600, 17000, 18000, 19000, 20000, 21000, 22000, 23000, 24000, or 25000), or about 25000-650000 (e.g., about 25000, 30000, 35000, 40000, 45000, 50000, 55000, 60000, or 65000).

The device can also include a compressor, e.g., to compress ambient air. A device may also include a source of heat and/or a source of vacuum. A device may also include a computer or other electronic controller to controller the gas compressor, gas flow, heater, vacuum, and/or valves.

Condensers

Devices of the invention may include a condenser. A condenser induces liquids to condense from a vapor or dispersed phase. Suitable condensers include surfaces cooled to below the dewpoint, a micron scale filter, a vortex from a directed gas flow, a refrigerated compressed air dryer, or porous membranes.

Exemplary coolers include high thermal mass or high surface area heat sinks, a heat exchanger, Peltier, flowing water, a chiller pump, etc.

Figure 4:
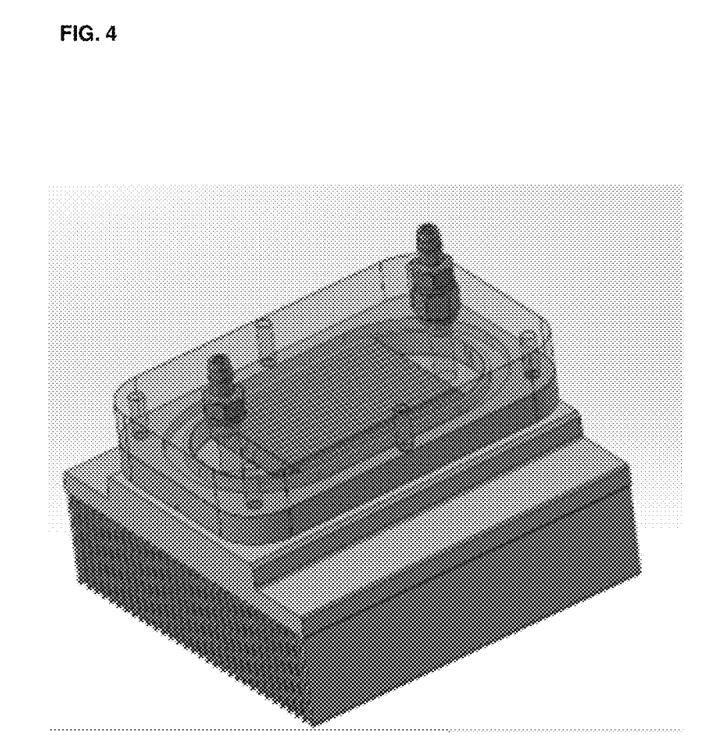
FIG. 4 is an illustration and photograph of a condensate trap including a condenser channel, condenser, trap, and medium.

In certain devices of the invention, e.g., FIG. 4, the condenser and the medium are a single component.

Figure 3:
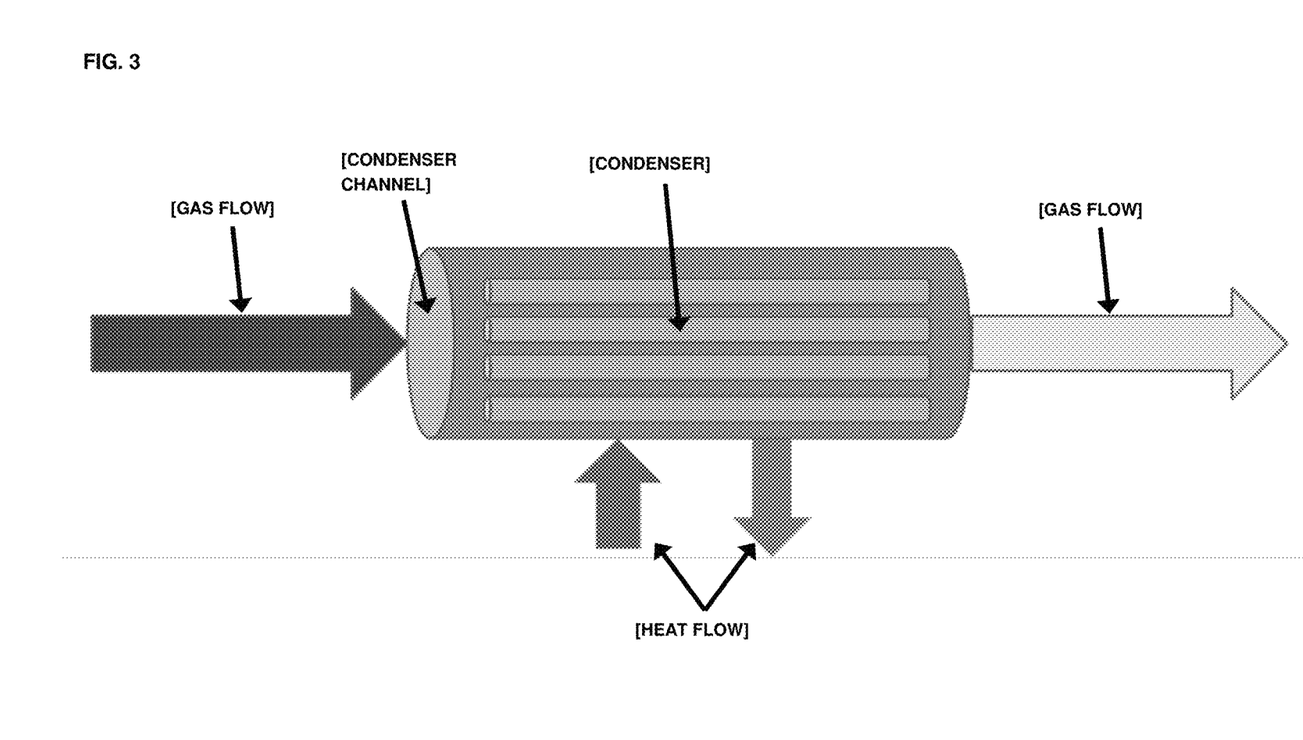
FIG. 3 is a schematic depiction of a condenser including bundled tubes in thermal communication with a source of heat and cooling.

In some embodiments the condenser includes a bundle of tubes or fins in thermal communication with a heat exchanger, such as in FIG. 3.

In some devices of the invention, liquid condensed on the condenser is passively transported to the medium by gravity or capillary action.

Medium

Devices and methods of the invention may include a medium having a surface area per unit volume of at least 1.62 mm$^{-1}$. Suitable media for use as the medium of the invention include, but are not limited to, Nylon frits, glass frits, a sintered metal filter, a pellet mesh, or metal fins.

Suitable media may also include certain porous media, which may be microporous, mesoporous, nanoporous, etc. Suitable media can include textured, roughened, or patterned surfaces. Textured, roughened, or patterned surfaces can include micro-, meso-, and/or nanoscale features. In some embodiments the medium is a bundle of tubes.

In some embodiments, the surface area of the medium is sufficient to condense about 100-1000 μL of the liquid, e.g., about 100-200 μL (e.g., about 100 μL, 110 μL, 120 μL, 130 μL, 140 μL, 150 μL, 160 μL, 170 μL, 180 μL, 190 μL, or 200 μL), e.g., 200-500 μL (e.g., 200 μL, 250 μL, 300 μL, 350 μL, 450 μL, or 500 μL), or, e.g., about 500-1000 (e.g., 500 μL, 600 μL, 700 μL, 800 μL, 900 μL, or 1000 μL).

Removal of Condensed Liquids

Devices of the invention may include a component for removing condensed liquid. Suitable components for removing water include those applying heat with or without the application of negative pressure (vacuum).

Suitable heaters include, but are not limited to, thermoelectric heaters, e.g., thermistors, resistive foil, metal ceramic heaters, thermal tape, a Peltier stage, a TEC controller, etc., in thermal communication with the medium.

The medium can be heated to a temperature of between about 65-98° C., e.g., 65° C.-75° C. (e.g., about 65.0° C., 66.0° C., 67.0° C., 68.0° C., 69.0° C., 70.0° C., 71.0° C., 72.0° C., 73.0° C., 74.0° C., or 75.0° C.) or about 75-98° C. (e.g., about 75.0° C., 78.0° C., 81.0° C., 84.0° C., 87.0° C., 90.0° C., 93.0° C., 96.0° C., or 98.0° C.).

Components for removing condensed liquid also include sources of vacuum. Vacuum can include any pressure below ambient atmospheric pressure (14.7 psi), e.g., between atmospheric pressure (14.7 psi) and absolute 0 pressure (0 psi), e.g., about 0.0000001-0.000001 psi, about 0.000001-0.00001 psi, about 0.00001-0.0001 psi, about 0.0001-0.001 psi, about 0.001-0.01 psi, about 0.01-0.1 psi, about 0.1-1.0 psi, or about 1-14.6 psi (e.g., about 1.0 psi, 1.5 psi, 2.0 psi, 2.5 psi, 3.0 psi, 3.5 psi, 4.0 psi, 4.5 psi, 5.0 psi, 5.5 psi, 6.0 psi, 6.5 psi, 7.0 psi, 7.5 psi, 8.0 psi, 8.5 psi, 9.0 psi, 9.5 psi, 10.0 psi, 10.5 psi, 11.0 psi, 11.5 psi, 12.0 psi, 12.5 psi, 13.0 psi, 13.5 psi, 14.0 psi, 14.5 psi, or 14.6 psi).

Vacuum can be achieved using, e.g., membrane pumps, diaphragm pumps, piston pumps, screw pumps, aspirators, etc.

It will be understood that any of the heating sources and temperatures described herein may also be used together.

In certain embodiments of the invention, condensed water is removed or reduced by gas flow by redirecting the flow to an outlet.

Methods of Operation

The invention provides methods of removing or reducing condensate in a device. In some embodiments, the gas is air, and the liquid is water. Compressed gas, e.g., compressed air, may be provided by a pump or compressor. In some embodiments, the compressor compresses ambient air. In some embodiments, the ambient air includes water vapor between 15 and 100% saturation In some embodiments, the gas flow has a flow rate between about 27 sccm and 931 sccm, e.g., about 27-50 sccm (e.g., about 27 sccm, 28 sccm, 29 sccm, 30 sccm, 31 sccm, 32 sccm, 33 sccm, 34 sccm, 35 sccm, 36 sccm, 37 sccm, 38 sccm, 39 sccm, 40 sccm, 41 sccm, 42 sccm, 43 sccm, 44 sccm, 45 sccm, 46 sccm, 47 sccm, 48 sccm, 49 sccm, or 50 sccm), about 50-100 sccm (e.g., about 50 sccm, 60 sccm, 70 sccm, 80 sccm, 90 sccm, or 100 sccm), or about 100-931 sccm (e.g., about 100 sccm, 150 sccm, 200 sccm, 250 sccm, 300 sccm, 350 sccm, 400 sccm, 450 sccm, 500 sccm, 550 sccm, 600 sccm, 650 sccm, 700 sccm, 750 sccm, 800 sccm, 850 sccm, 900 sccm, or 931 sccm).

In certain embodiments of the method, the gas flow is at a pressure of between about 24 psi and 34 psi (e.g., about 24 psi, 25 psi, 26 psi, 27 psi, 28 psi, 29 psi, 30 psi, 31 psi, 32 psi, 33 psi, or 34 psi).

In one embodiment, the method includes flowing gas through a device and allowing liquid in the gas to be condensed by a condenser, where it is adsorbed by a medium. Condensed liquid may be subsequently removed from the medium using heat or vacuum. In some embodiments, the gas flow leaving the condenser is cooled to about 1° C. In some embodiments the gas flow leaving the condenser is neither cooled nor heated but exits at substantially the same temperature as the feed gas.

In certain embodiments, the heat source provides heat such that the medium is heated to a temperature about 65-98° C., e.g., about 65° C.-75° C. (e.g., about 65.0° C., 66.0° C., 67.0° C., 68.0° C., 69.0° C., 70.0° C., 71.0° C., 72.0° C., 73.0° C., 74.0° C., or 75.0° C.) or about 75-98° C. (e.g., about 75.0° C., 78.0° C., 81.0° C., 84.0° C., 87.0° C., 90.0° C., 93.0° C., 96.0° C., or 98.0° C.).

For a device of the invention including a valve to allow directing condensate to an outlet, the method may include directing gas from the compressor through the valve to the pneumatic actuator or manifold. After a first predetermined amount of time during which a condensate forms, gas from the compressor is directed through the valve to a second flow path for a second predetermined amount of time sufficient to reduce the condensate in the first flow path.

In some embodiments of the method the second predetermined time is between about 15 s and 300 s, e.g., about 15-30 s (e.g., about 15 s, 16 s, 17 s, 18 s, 19 s, 20 s, 21 s, 22 s, 23 s, 24 s, 25 s, 26 s, 27 s, 28 s, 29 s, or 30 s), 30-180 s (e.g., about 30 s, 40 s, 50 s, 60 s, 70 s, 80 s, 90 s, 100 s, 110 s, 120 s, 130 s, 140 s, 150 s, 160 s, 170 s, or 180 s), or about 180-300 s (e.g., 180 s, 200 s, 220 s, 240 s, 260 s, 280 s, or 300 s). In some embodiments, the first predetermined time is between about 10 minutes and 1 h, e.g., about 10-20 minutes (e.g., about 10 minutes, 11 minutes, 12 minutes, 13 minutes, 14 minutes, 15 minutes, 16 minutes, 17 minutes, 18 minutes, 19 minutes, or 20 minutes), about 20-40 minutes (e.g., about 20 minutes, 22 minutes, 24 minutes, 26 minutes, 28 minutes, 30 minutes, 32 minutes, 34 minutes, 36 minutes, 38 minutes, or 40 minutes), or about 40-60 minutes (e.g., about 40 minutes, 45 minutes, 50 minutes, 55 minutes, or 60 minutes). In some embodiments the flow rate to remove the condensate is between about 0.035 and 63 scfm, e.g., about 0.035-0.100 scfm (e.g., about 0.035 scfm, 0.040 scfm, 0.045 scfm, 0.050 scfm, 0.055 scfm, 0.060 scfm, 0.065 scfm, 0.070 scfm, 0.075 scfm, 0.080 scfm, 0.085 scfm, 0.09 scfm, 0.095 scfm, 0.100 scfm), about 0.10-1.00 (e.g., about 0.10 scfm, 0.20 scfm, 0.30 scfm, 0.40 scfm, 0.50 scfm, 0.60 scfm, 0.70 scfm, 0.80 scfm, 0.90 scfm, or 1.00 scfm), about 1-10 scfm (e.g., about 1 scfm, 2 scfm, 3 scfm, 4 scfm, 5 scfm, 6 scfm, 7 scfm, 8 scfm, 9 scfm or 10 scfm), or about 10-65 (e.g., about 10 scfm, 15 scfm, 20 scfm, 25 scfm, 30 scfm, 35 scfm, 40 scfm, 45 scfm, 50 scfm, 55 scfm, 60 scfm, or 65 scfm).

In some embodiments, the gas flow during condensate removal in the first flow path is at a pressure of between 0 and about 32 psi, e.g., about 0 psi, 1 psi, 2 psi, 3 psi, 4 psi, 5 psi, 6 psi, 7 psi, 8 psi, 9 psi, 10 psi, 11 psi, 12 psi, 13 psi, 14 psi, 15 psi, 16 psi, 17 psi, 18 psi, 19 psi, 20 psi, 21 psi, 22 psi, 23 psi, 24 psi, 25 psi, 26 psi, 27 psi, 28 psi, 29 psi, 30 psi, 31 psi, or 32 psi.

EXAMPLES

Example 1

Figure 1:
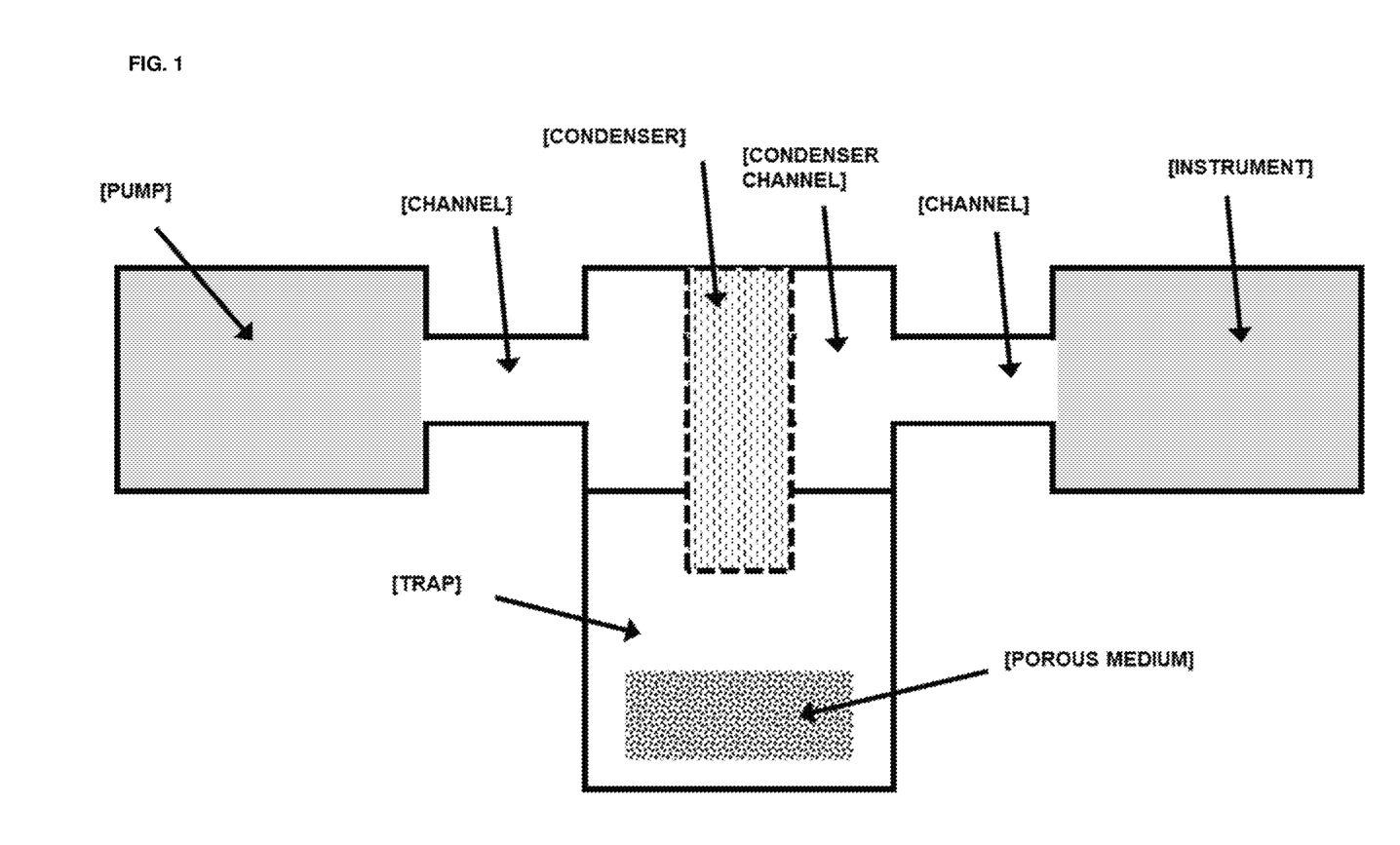
FIG. 1 is a schematic depiction of a device including a condenser with trap, a medium within the trap, a pump.

FIG. 1 shows a schematic of a device of the invention, featuring a condenser channel, a condenser, a trap, a medium of the invention within the trap, and representations of the pump and rest of the instrument in which the invention is incorporated. Compressed air is pumped through the condenser channel and condenser to the instrument, and water condensed on the condenser is captured in the trap, where it is adsorbed by the medium. Water in the trap is removed by evaporation under reduced pressure from a vacuum pump.

Example 2

Figure 2:
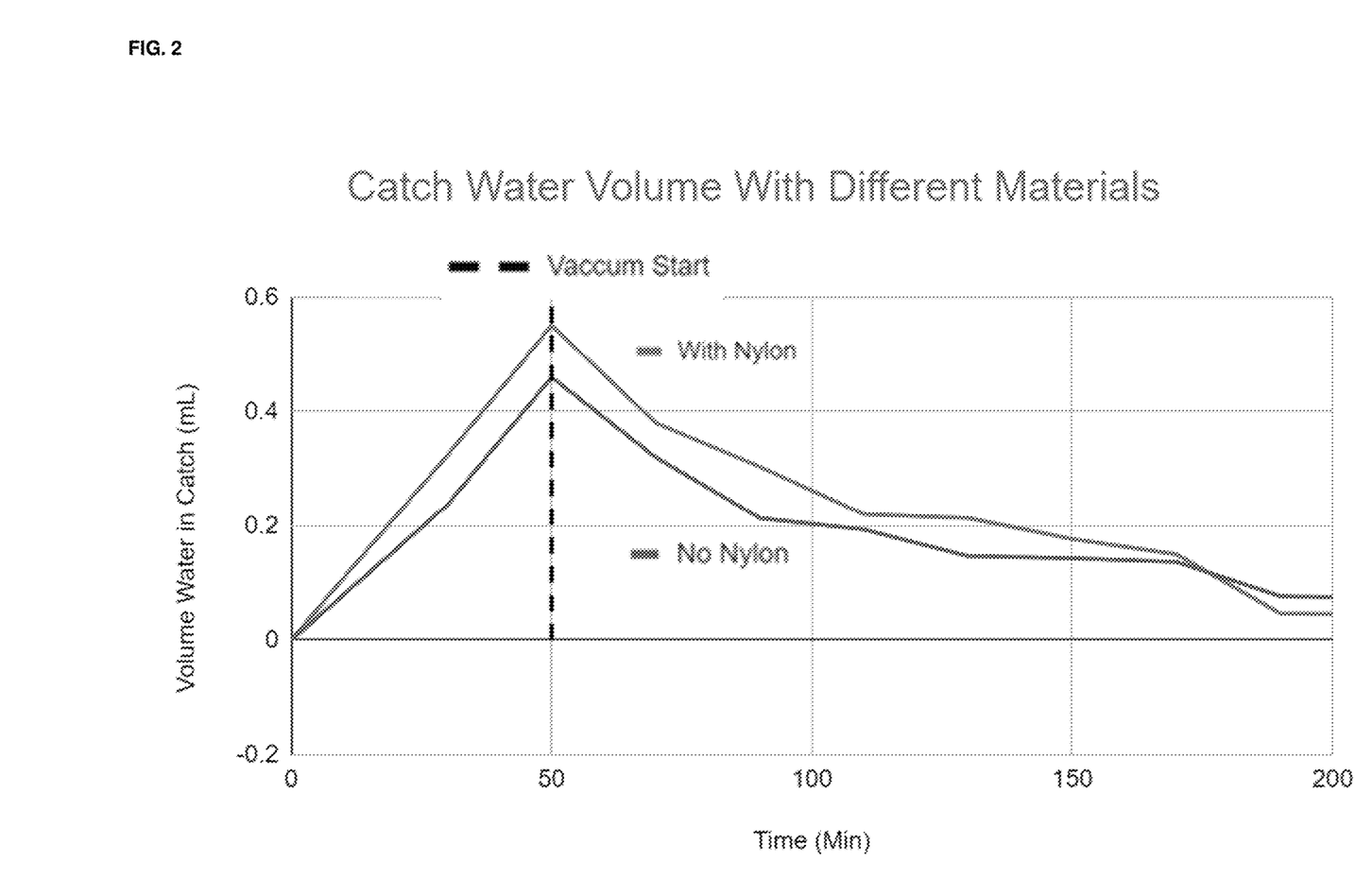
FIG. 2 is a graph demonstrating the difference in the kinetics of both water capture and removal, with and without the inclusion of a medium of the invention.

FIG. 2 shows a graph comparing the kinetics of water capture and removal from a device of FIG. 1 when the porous medium is present versus when it is absent. In this example, the medium is a Nylon frit. The line labelled "No Nylon" represents the volume of water captured in mL in the trap as a function of time in minutes with no medium, and the line labelled "With Nylon" represents the volume of water captured in mL in the trap as a function of time in minutes when a medium is present. The vertical dashed line signals the time at which vacuum was applied and the device was switched from operational mode to drying mode. Moist air was pumped through the device for 50 minutes, at which time the device was switched to applying vacuum, for a further 150 minutes. FIG. 2 shows that both water capture and water removal are faster in the device that contains the medium (the Nylon frit).

Example 3

FIG. 3 illustrates an embodiment of the invention where the condenser is a bundle of capillary tubes in thermal communication with a source of heating and cooling. The bundled capillary tubes are cooled for liquid capture and heated for liquid removal under vacuum or gas flow. This embodiment does not require a separate trap.

Example 4

FIG. 4 shows an illustration of a combined condenser and trap. The condenser includes a compartment with inlet and outlet ports that is otherwise sealed and contains a medium. Compressed air is passed through the inlet to the outlet through the medium, which is cooled by a Peltier to condense water. To remove the condensed water, the Peltier is switched to heating mode, and the device is either opened to atmosphere or further air flow or vacuum is applied to allow the condensed water to be driven off by the combination or heat and/or air flow or vacuum.

Example 5

Figure 5:
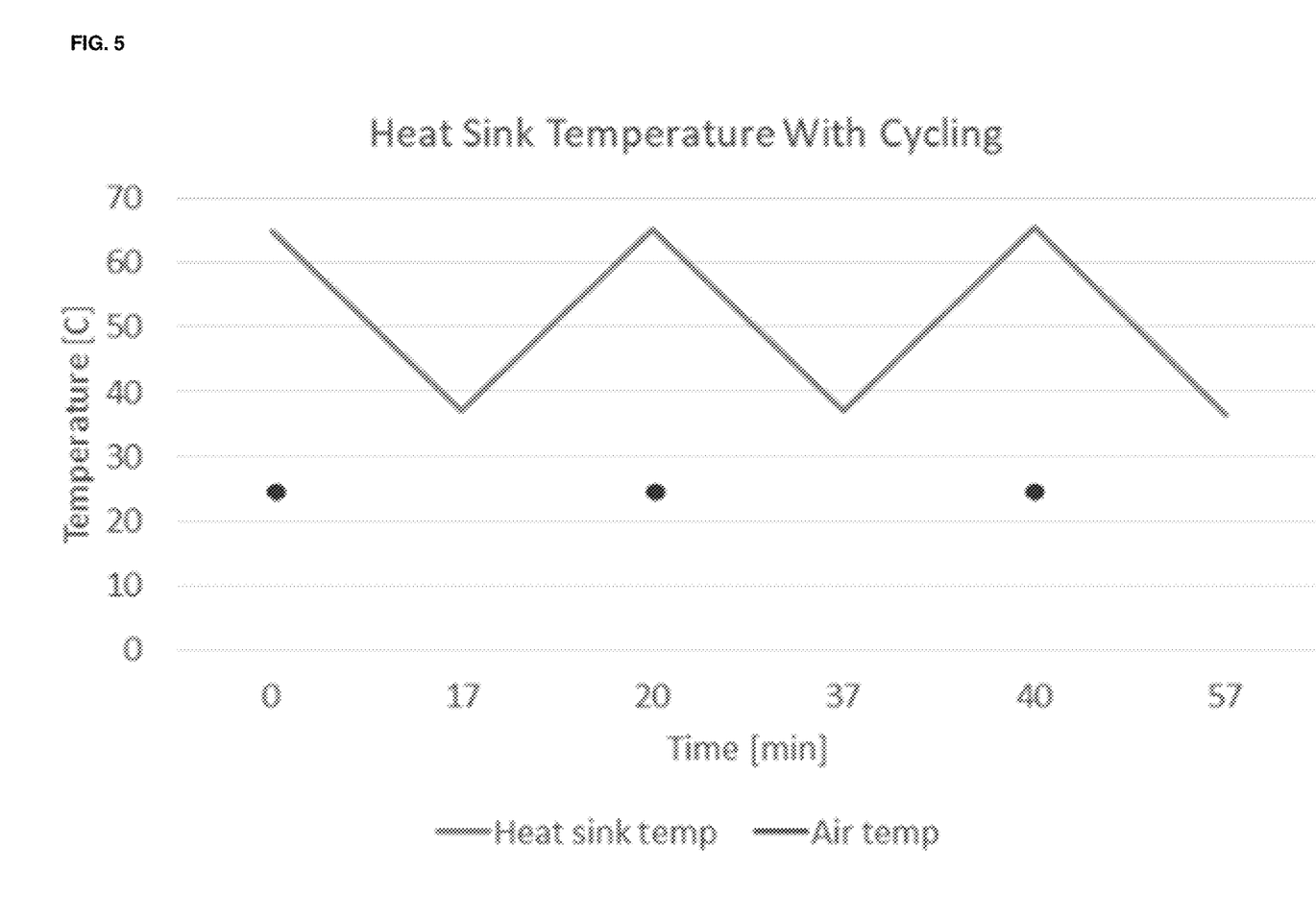
FIG. 5 is a graph of heat sink temperature and air temperature leaving a device of the invention.

FIG. 5 shows the effect of using an embodiment of the invention to capture water on the air temperature output by the device. The temperature of the heat sink (solid line) was cycled between about 65° C. and about 38° C. in cycles of 17 min running air through the device, followed by heating for 2 min, followed by cooling for 1 minute, followed by running for 17 minutes. The air temperature (solid circles) was recorded at the 0 min, 20 min and 40 min timepoints and stayed consistently about 24° C.

Example 6

Figure 6:
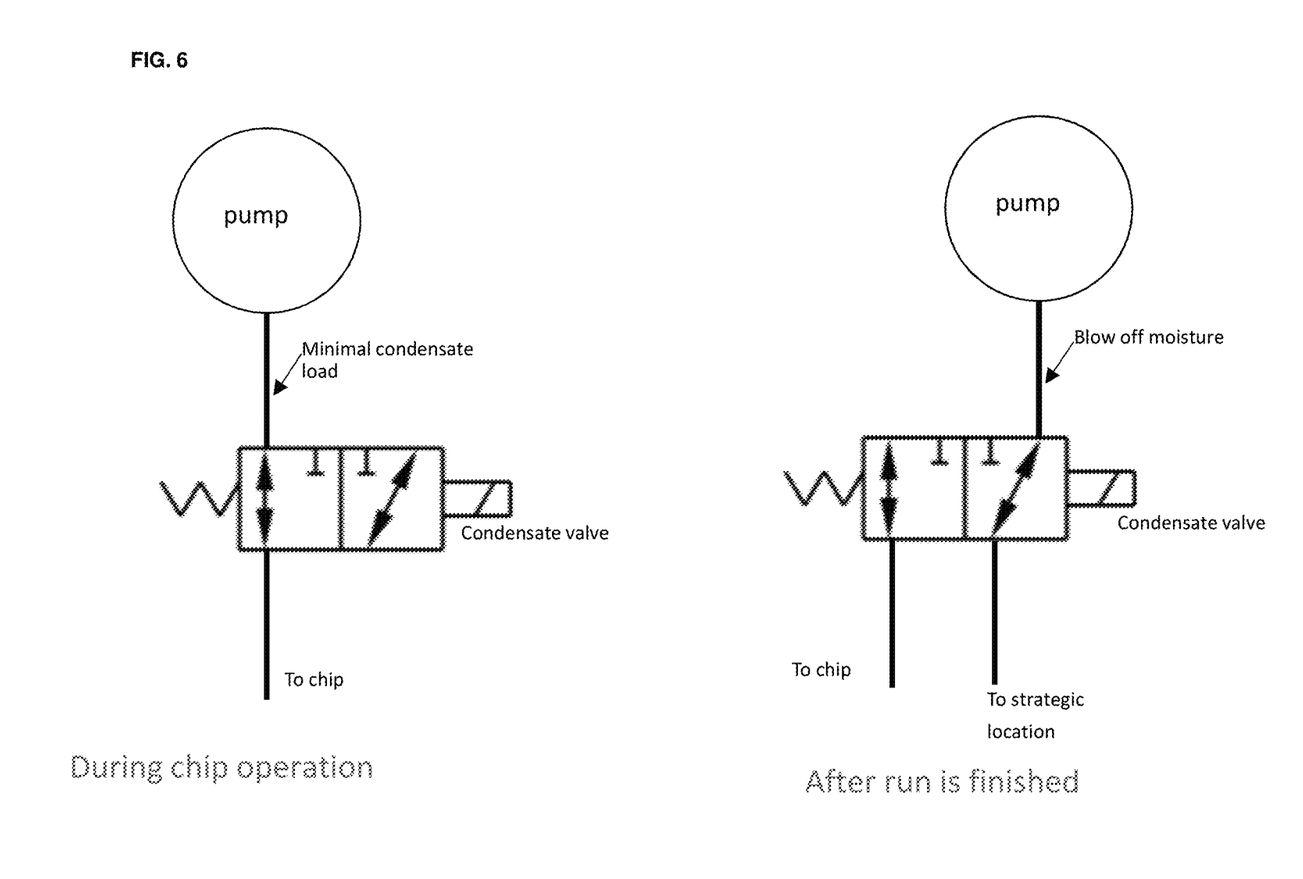
FIG. 6 is a schematic depiction of a device having a first flow path leading to a valve that switches from access to a fluidic actuator or manifold to a second flow path.

FIG. 6 shows a schematic of an aspect of the invention that removes condensate by switching the air flow to a low resistance line to blow off moisture using air in between cycles of use. Condensation is also minimized by restricting air flow during a cycle using a high resistance bleed outlet.

What is claimed is:
1. A device comprising:
 a) a first flow path having proximal and distal ends;
 b) a second flow path having proximal and distal ends;
 c) a valve at the distal end of the first flow path;
 d) a gas compressor; and
 e) a pneumatic actuator or manifold;
wherein the gas compressor is in fluid communication with the proximal end of the first flow path; wherein the valve is disposed to control flow from the distal end of the first flow path to the pneumatic actuator or manifold to the proximal end of the second flow path; wherein the second flow path has a lower fluidic resistance than the first flow path.

2. The device of claim 1, further comprising a bleed outlet in the manifold in fluid communication with the first flow path.

3. The device of claim 2, wherein the bleed outlet comprises a muffler with a pore size ranging from 5 μm to 100 μm.

4. The device of claim 1, wherein the valve comprises a 3/2 valve or a solenoid valve.

5. The device of claim 1, wherein the pneumatic actuator or manifold controls fluid flow in a microfluidic device.

6. A method of operating a device, comprising:
   a) providing the device of claim 1;
   b) directing gas from the gas compressor through the valve to the pneumatic actuator or manifold for a first predetermined amount of time, wherein a condensate forms in the first flow path; and
   c) directing gas from the gas compressor through the valve to the second flow path for a second predetermined amount of time sufficient to reduce the condensate in the first flow path.

7. The method of claim 6, wherein the second predetermined time is between 15 s and 300 s.

8. The method of claim 6, wherein the gas compressor compresses ambient air.

9. The method of claim 8, wherein the ambient air comprises water vapor between 15 and 100% saturation.

\* \* \* \* \*